US008826859B1

(12) United States Patent
Slinkard

(10) Patent No.: US 8,826,859 B1
(45) Date of Patent: Sep. 9, 2014

(54) ANIMAL DRINKER

(71) Applicant: Harris Farms, LLC, Nolensville, TN (US)

(72) Inventor: Paul H. Slinkard, Nolensville, TN (US)

(73) Assignee: Harris Farms, LLC, Nolensville, TN (US)

( * ) Notice: Subject to any disclaimer, the term of this patent is extended or adjusted under 35 U.S.C. 154(b) by 7 days.

(21) Appl. No.: 13/693,468

(22) Filed: Dec. 4, 2012

(51) Int. Cl.
*A01K 7/04* (2006.01)
*A01K 39/024* (2006.01)

(52) U.S. Cl.
CPC .................................. *A01K 39/024* (2013.01)
USPC ............................................... 119/80; 119/78

(58) Field of Classification Search
USPC ........... 119/51.5, 72, 74, 77–79, 80; 137/429, 137/395–398, 433; 222/67, 68, 64
IPC ................. A01K 7/04,7/02, 7/00, 39/00, 39/02, A01K 39/024
See application file for complete search history.

(56) References Cited

U.S. PATENT DOCUMENTS

| | | | | |
|---|---|---|---|---|
| 1,692,131 | A | * 11/1928 | Martin | ........................... 417/116 |
| 2,844,147 | A | * 7/1958 | Beachman | .................... 604/127 |
| 3,324,834 | A | 6/1967 | McKinstry | |
| 3,450,103 | A | 6/1969 | Davis | |
| 3,667,493 | A | * 6/1972 | Lindstrom et al. | ......... 137/87.02 |
| 4,180,015 | A | 12/1979 | Dawson, Jr. | |
| 4,196,699 | A | 4/1980 | Leeming | |
| 4,659,463 | A | * 4/1987 | Chandler et al. | .............. 210/202 |
| 7,946,249 | B2 | 5/2011 | Colvin et al. | |
| 2010/0162961 | A1* | 7/2010 | Hove et al. | .................... 119/51.5 |
| 2010/0224132 | A1* | 9/2010 | Gauker et al. | ................... 119/80 |

* cited by examiner

*Primary Examiner* — Son T Nguyen
*Assistant Examiner* — Kathleen Alker
(74) *Attorney, Agent, or Firm* — Jason R. Sytsma; Shuttleworth & Ingersoll, PLC

(57) ABSTRACT

An animal drinker includes a base tray that is defined by an exterior drinking trough connected to an interior fluid reservoir by a passageway. The trough and the interior fluid reservoir are maintained at a consistent fluid level. An upper reservoir stores fluid above the interior reservoir and is in fluid communication therewith by an outlet positioned at the bottom. A buoyant float pan is positioned in the interior fluid reservoir of the base tray. A float stop is positioned between the float pan and the outlet of the upper reservoir to stop the flow of fluid from the upper reservoir to the interior fluid reservoir at a predetermined level.

8 Claims, 4 Drawing Sheets

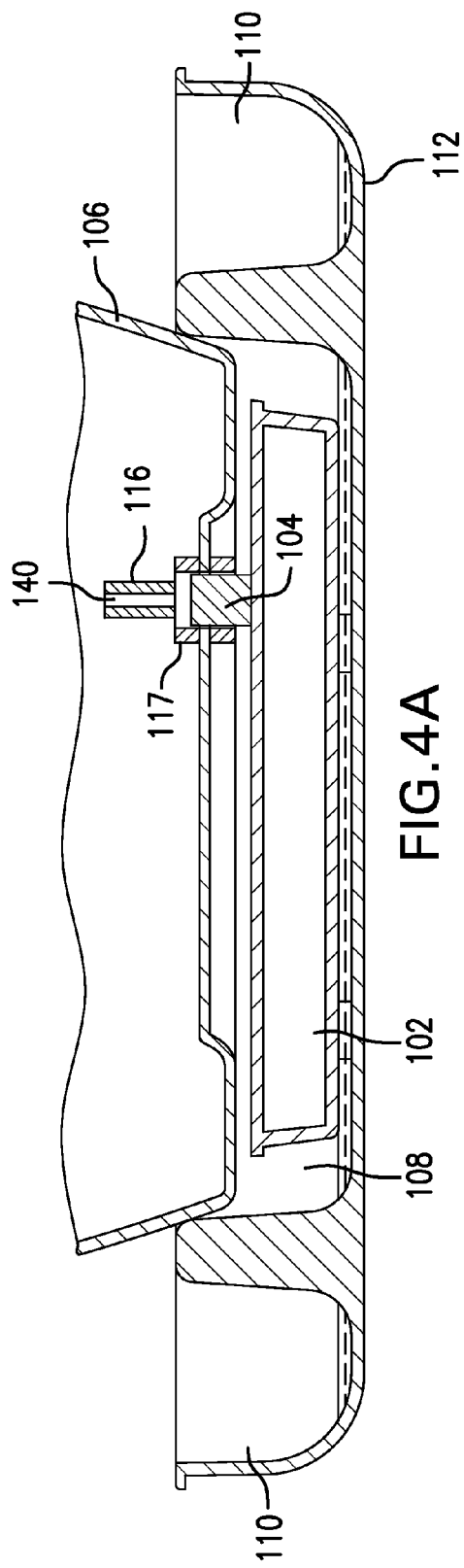
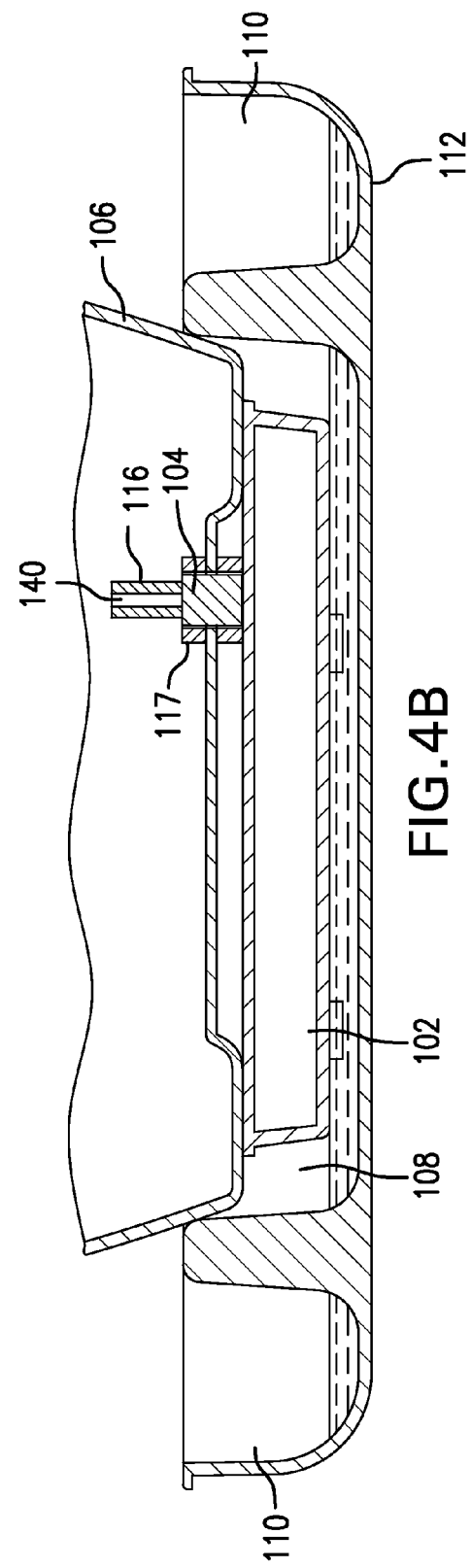

ANIMAL DRINKER

BACKGROUND

The present disclosure relates generally to supplying water to poultry or like animals, and more particularly to an intermittent and automatic provision of fresh water to poultry.

Poultry drinking troughs are well known. Such devices may include a trough which is automatically supplied with water as the water level in the trough drops below a predetermined level. The problem with such automated devices is that they are overly complicated with several moving parts and the valve mechanisms are prone to sticking which can cause water to either cease flowing into the trough or overflow the trough. Either case is undesirable. Therefore, it would be advantageous to provide an intermittent and automatic drinker that is easy to assemble and reliable.

SUMMARY OF THE INVENTION

An animal drinker includes a base tray that is defined by an exterior drinking trough connected to an interior fluid reservoir by a passageway. The trough and the interior fluid reservoir are maintained at a consistent fluid level. An upper reservoir stores fluid above the interior reservoir and is in fluid communication therewith by an outlet positioned at the bottom. A buoyant float pan is positioned in the interior fluid reservoir of the base tray. A float stop is positioned between the float pan and the outlet of the upper reservoir to stop the flow of fluid from the upper reservoir to the interior fluid reservoir at a predetermined level.

BRIEF DESCRIPTION OF THE DRAWINGS

FIG. 4A is a cross-sectional view of the animal drinker of FIG. 1 with the outlet in the open position.

FIG. 4B is a cross-sectional view of the animal drinker of FIG. 1 with the outlet in the closed position.

DESCRIPTION OF THE ILLUSTRATED EMBODIMENTS

Figure 1:
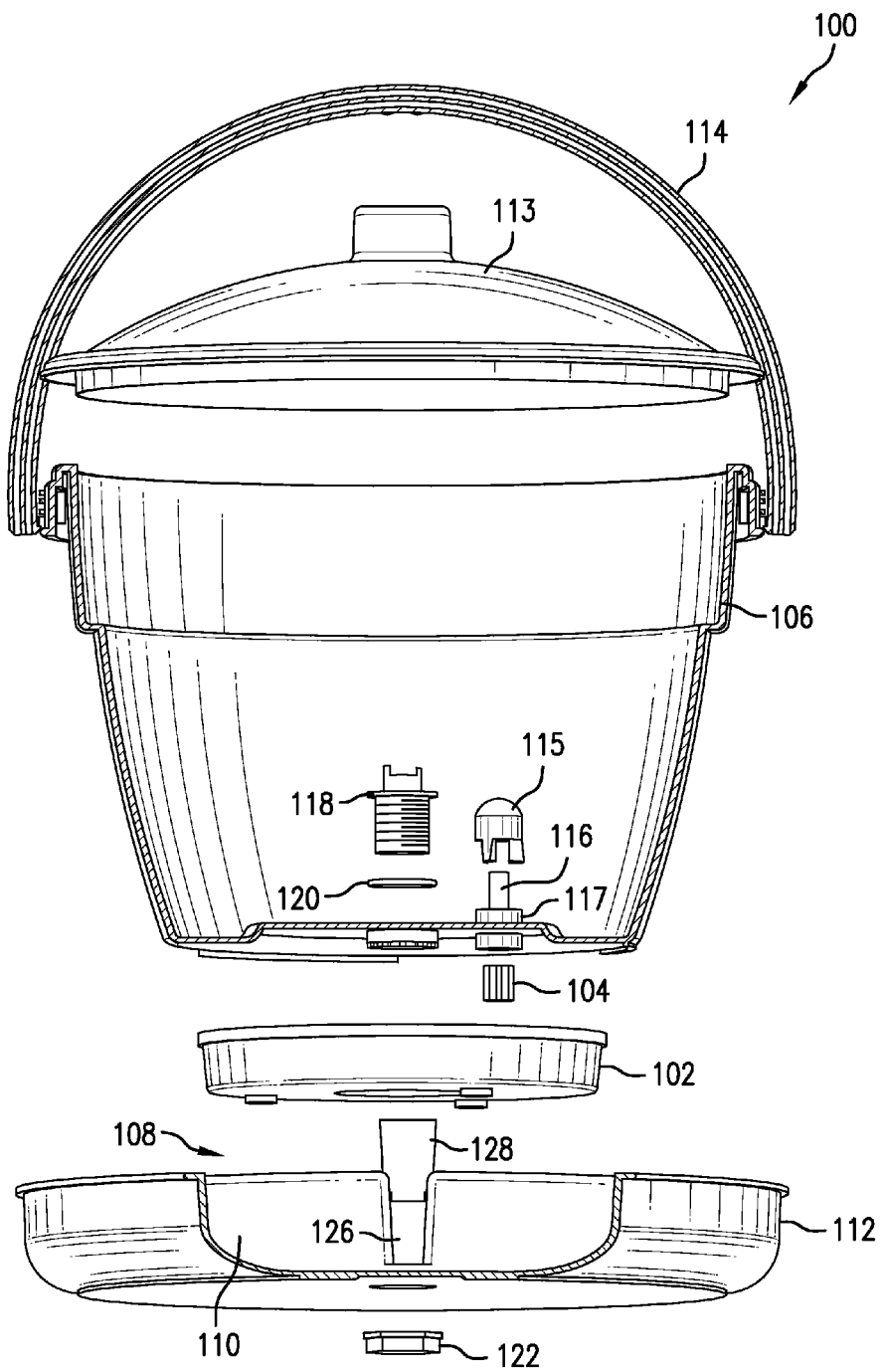
FIG. 1 is an exploded view of an exemplary animal drinker according to the illustrated embodiment.
Figure 2:
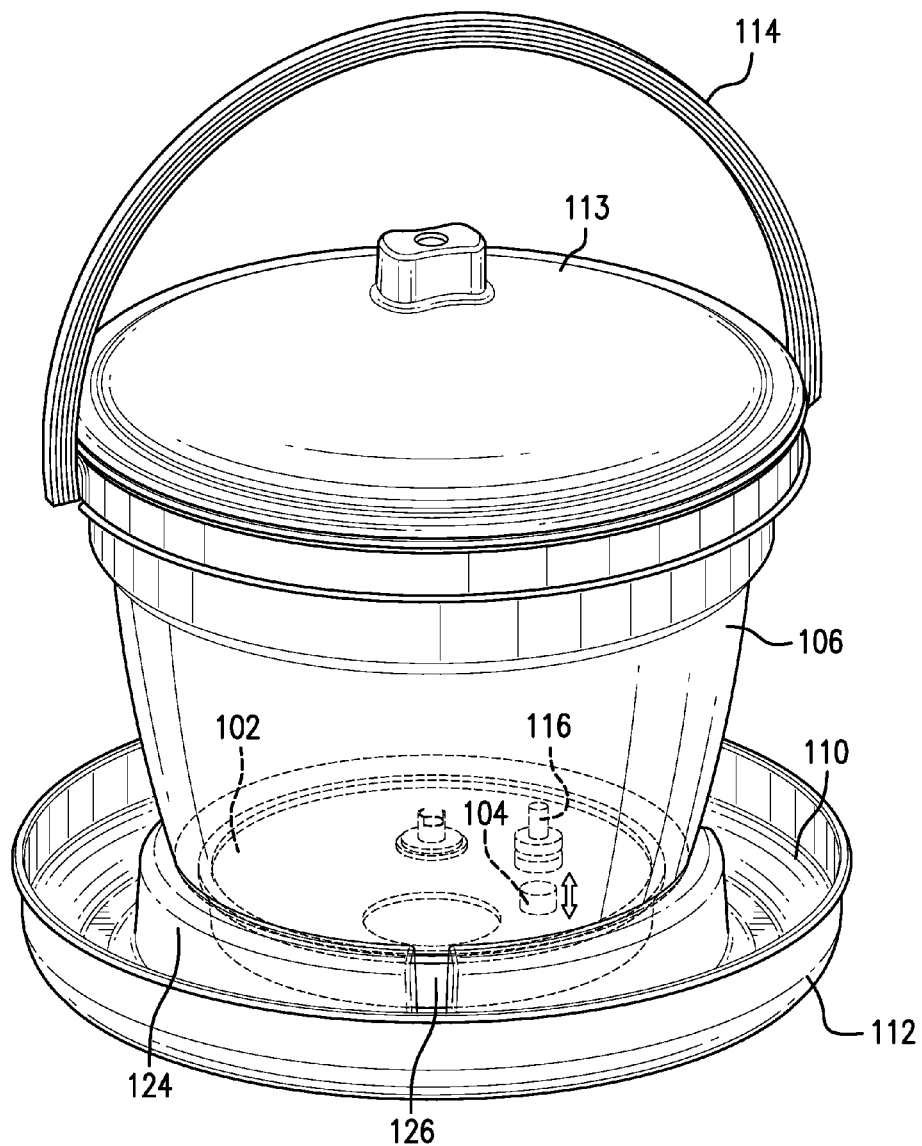
FIG. 2 is the animal drinker of FIG. 1.

The present disclosure is an animal drinker 100 as shown in FIGS. 1-2. The animal drinker 100 contains a float pan 102 and a float stop 104, which together regulate the flow of fluid from an upper reservoir 106 to a lower reservoir 108 (shown more clearly in FIGS. 4A and 4B), and into a trough 110. Float pan 102 and float stop 104 either prevent or allow the flow of fluid depending upon the volume of fluid in trough 110.

Referring to FIG. 1, an exploded view of animal drinker 100 is shown. Animal drinker 100 includes upper reservoir 106 for storing fluid, a base tray 112, float pan 102 and float stop 104. Upper reservoir 106 is attached to base tray 112 and is in fluid communication with base tray 112. Float pan 102 and float stop 104 are positioned between base tray 112 and upper reservoir 106. When fluid flows through upper reservoir 106 and into base tray 112, float pan 102 will rise until float stop 104 prevents the fluid from flowing through upper reservoir 106 and into base tray 112. By having float pan 102 and float stop 104 regulate the flow of fluid, animal drinker 100 requires less maintenance, reduced spillage, and self-regulation of the fluid.

Upper reservoir 106 is covered by a lid 113 and is moveable by a handle 114. Upper reservoir 106 has a sufficient volume to hold enough fluid to fill base tray 112 and, as a result, allow float pan 102 and float stop 104 to rise. In one embodiment, upper reservoir 106 defines the shape of a bucket or a container; however, it should be noted that upper reservoir 106 may define any other shape.

Upper reservoir 106 is removable from base tray 112. In a preferred embodiment, upper reservoir 106 is threadably attached to base tray 112 by a screw 118, a washer 120, and a nut 122. It should be noted that alternative methods known in the art for attaching upper reservoir 106 to base tray 112 are also suitable. For example, upper reservoir 106 may be fixedly attached to base tray 112 without the use of threads.

The bottom end of upper reservoir 106 is partially closed off, and has a connecting passageway or outlet 116 for fluid to exit upper reservoir 106 into base tray 112. In a preferred embodiment, there is one outlet 116, but alternative embodiments may contain two or more outlets 116. It should be noted that the size of outlet 116 may be adjusted according to the viscosity of the fluid and the desired flow rate of the fluid from upper reservoir 106 to base tray 112. The outlet 116 can be plugged with a plug 115 at the point of sale, which can be disposed after use. The bottom portion of outlet 116 is defined by a chamber 117 sized to receive float stop 14. This interaction will be more thoroughly discussed below.

FIG. 2 shows animal drinker 100, as it is assembled. Upper reservoir 106 is positioned atop base tray 112 on a side-wall 124 partially circumscribing the inside of base tray 112 defining interior, lower reservoir 108. Referring briefly to FIGS. 4A and 4B, Float pan 102 and float stop 104 are positioned in lower reservoir 108 and move up and down with the fluid level in lower reservoir 108. A passageway 126 provides a channel for fluid to move from lower reservoir 108 to trough 110. It is contemplated that lower reservoir 108 and trough 110 can be any depth. Furthermore, passageway 126 can be temporarily or partially blocked with a stop 128 (shown in FIG. 1) to limit the amount of fluid that flows into trough 110.

Figure 3B:
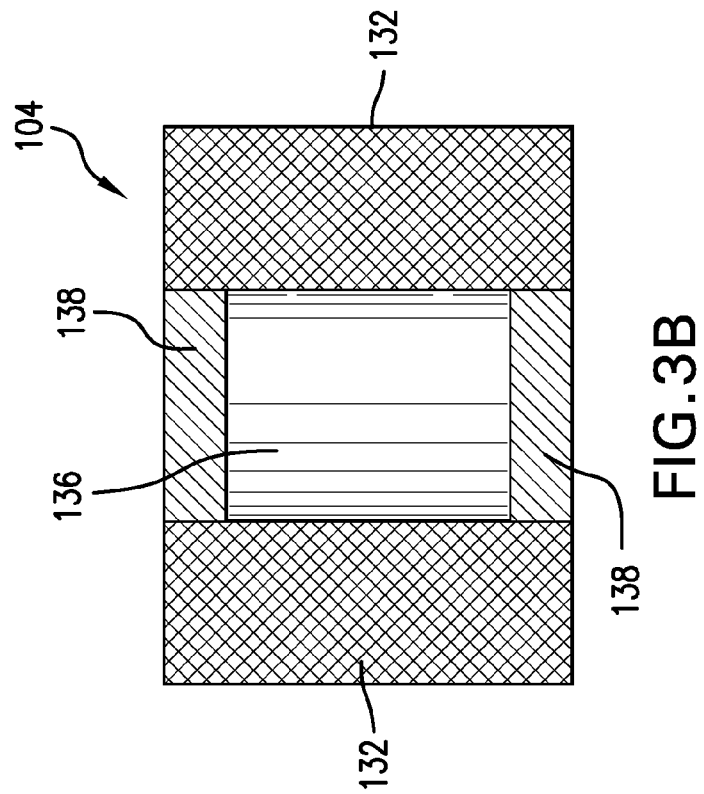
FIG. 3B is a cross-sectional view of the float stop of FIG. 1.
Figure 3A:
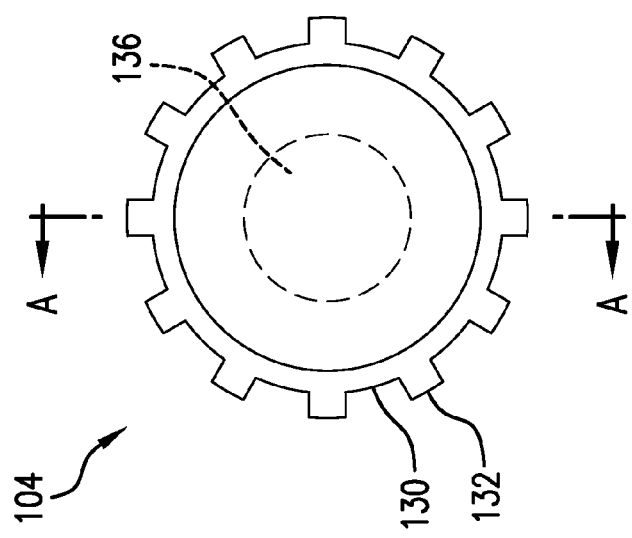
FIG. 3A is a top view of a float stop from the animal drinker of FIG. 1.

FIGS. 3A and 3B show float stop 104. Float stop 104 is defined by an outer shell 130 circumscribed by a plurality of ribs 132 spaced around the diameter of float stop 104 with each rib 132 extending substantially the length of float stop 104. A channel 134 extends through float stop 104 so that when it is sealed, a void 136 for holding air is formed. Void 136 provides float stop 104 with its buoyancy permitting it to float. Float stop 104 is capped at each end by a stop 138 giving it a cylindrical shape. The cylindrical shape of float stop 104, including its flat top and bottom surfaces keeps float stop 104 upright so it can properly seal outlet 116 and does not get stuck in an open position.

Float stop 104 is sized in diameter and length to fit inside chamber 117 of outlet 116. The distance the float stop moves between its lowest position where lower reservoir 108 is empty and float pan 102 is at the bottom of base tray 112, and its highest position where float stop 104 seals outlet 116 is less than the overall length of float stop 104 so that float stop 104 does not remove itself from chamber 117. Ribs 132 extending around the surface of float stop 104 permits fluid to flow around float stop 104. The diameter of float stop 104 and the inner diameter of chamber 117 are similarly sized so that float stop 104 remains upright.

Float stop 104 can be made from any type of material provided it keeps float stop buoyant. Furthermore, stops 138 can be made from any buoyant material, provided that it prevents fluid from entering void 136. Float stop 104 can be separate from float pan 102, or integrally combined with float pan 102.

Referring to FIG. 4A, in operation, a user opens lid 113 and fills upper reservoir 106 with fluid. As upper reservoir 106 is being filled, fluid begins to flow through an exit port 140 in outlet 116 and into lower reservoir 108 of base tray 112 through passageway 126 and into trough 110. As lower reservoir 108 begins to fill, float pan 102 gradually begins to rise moving float stop 104 upward thus forcing float stop 104 into sealing engagement with the outlet of exit port 140 in outlet 116 located in the upper portion of chamber 117.

When exit port 140 is completely blocked by float stop 104, the fluid is prevented from moving from upper reservoir 106 through exit port 140. As a result, leakage or overflow of the fluid is prevented. In addition, the fluid inside upper reservoir 106 is preserved inside and used when necessary to fill trough 110 of base tray 112.

Referring to FIG. 4B, as animals begin consuming fluid in trough 110, the fluid level begins to lower. Float pan 102 lowers with the fluid level removing float stop 104 from engagement with exit port 140 to permit fluid in upper reservoir 106 to flow therethrough into lower reservoir 108. Animal drinker 100 permits easy and convenient refilling of trough 110. When upper reservoir 106 is near empty, lid 113 can be removed so that upper reservoir 106 can be refilled without the need to disassemble animal drinker 100.

To those skilled in the art to which this disclosure relates, many changes in construction and widely differing embodiments and applications will suggest themselves without departing from the spirit and scope of the disclosure. The disclosures and the descriptions herein are purely illustrative and are not intended to be in any sense limiting. Various aspects of the different embodiments can be combined in different combinations to create new embodiments within the scope of the invention.

What is claimed is:

1. An animal drinker, comprising:
    a base tray defined by an exterior drinking trough and an interior fluid reservoir and including a connecting passageway for maintaining a fluid at a fluid level that is the same in each of the exterior drinking trough and the interior fluid reservoir;
    an upper reservoir for storing fluid positioned above the interior fluid reservoir and having an outlet positioned at a bottom of the upper reservoir;
    a buoyant float pan positioned in the interior fluid reservoir of the base tray; and
    a cylindrical float stop positioned between the float pan and the outlet of the upper reservoir to selectively stop a flow of the fluid from the upper reservoir to the interior fluid reservoir, wherein the cylindrical float stop defines an interior channel having a void for holding air and the cylindrical float stop is capped at each end by a flat stop for holding air in the void to give the float stop a substantially flat top surface and a substantially flat bottom surface, and the cylindrical float stop has a plurality of ribs spaced around the cylindrical float stop that each extend linearly and substantially a length of the cylindrical float stop between the substantially flat top surface and the substantially flat bottom surface.

2. The drinker of claim 1, and further comprising a chamber positioned in line with the outlet for receiving the cylindrical float stop.

3. The drinker of claim 1, wherein the chamber has a diameter slightly larger than a diameter of the cylindrical float stop, such that the cylindrical float stop fits loosely within the chamber so that fluid can flow around the cylindrical float stop into the interior fluid reservoir.

4. The drinker of claim 3, wherein the cylindrical float stop is positioned within the chamber in a generally upright position, wherein the substantially flat top surface of the cylindrical float stop selectively engages the outlet to stop the flow of the fluid from the upper reservoir to the interior fluid reservoir.

5. The drinker of claim 4, wherein the cylindrical float stop is maintained in a generally upright position within the chamber with the substantially flat top surface and the substantially flat bottom surface of the cylindrical float stop generally parallel with a top of the float pan.

6. An animal drinker, comprising:
    a base tray defined by an exterior drinking trough and an interior fluid reservoir and including a connecting passageway for maintaining a fluid at a fluid level that is the same in each of the exterior drinking trough and the interior fluid reservoir;
    a container for storing fluid positioned above the interior fluid reservoir and having a cylindrical chamber that extends partially into the container and partially outside a bottom of the container, and an outlet in the cylindrical chamber;
    a float pan positioned in the interior fluid reservoir of the base tray that moves with the fluid level; and
    a float stop with a flat top surface that engages the outlet to stop the flow of the fluid into the interior fluid reservoir, the float stop being integrally combined as a single unit with the float pan, wherein the float stop is positioned in the cylindrical chamber of the container to temporarily stop a flow of the fluid from the container to the interior fluid reservoir, wherein the float stop is maintained in a generally upright position within the chamber by the float pan.

7. The drinker of claim 6, wherein the float stop further comprises a plurality of ribs spaced around the float stop, so that fluid can flow around the float stop.

8. The drinker of claim 6, wherein the chamber has a diameter slightly larger than a diameter of the float stop, such that the float stop fits loosely within the chamber so that fluid can flow around the float stop into the interior fluid reservoir.

* * * * *